United States Patent Office 3,428,719
Patented Feb. 18, 1969

3,428,719
METHOD OF PRODUCING HIGH TEMPERATURE RESISTANT STRUCTURES
James A. Robertson, Levittown, Pa., assignor to FMC Corporation, Philadelphia, Pa., a corporation of Delaware
No Drawing. Filed Oct. 23, 1965, Ser. No. 504,099
U.S. Cl. 264—29                                   14 Claims
Int. Cl. C01b 31/30

ABSTRACT OF THE DISCLOSURE

High temperature-resistant and erosion-resistant shaped structures formed by controlled heat treatments of a shaped structure comprising a cellulosic material and at least one polymerized glass-forming inorganic oxide each being present in its own continuous network in intimate contact with and intermingled with the network of the other. The heat treating steps are scheduled and controlled to provide a structure consisting essentially of (1) carbon and the inorganic oxide, or (2) the inorganic oxide, or (3) a carbide of the metal of the inorganic oxide. The shaped structures are of particularly utility in reinforcing high temperature resistant resins.

---

This invention relates to a method of forming high temperature-resistant and erosion-resistant shaped bodies or structures such as films, fibers, plates and the like.

In the past, shaped bodies resistant to high temperatures have been formed of substances which themselves, after initial firing, remain substantially unaltered under the conditions existing at the temperatures encountered during use. Presently, such bodies are considered as ablative structures and are generally formed of mixtures of substances. In this type structure or body, certain of the constituents are not in themselves resistant to the high emperature conditions but dissipaate energy by becoming transformed from one form or state to another and may then become ablated. However, other constituents of the structure are resistant to the higher temperatures and retain the structure or body in its original physical form. The present invention relates to shaped bodies which may be classed as ablative structures which, during use, are transformed or converted into sintered ceramic structures.

The term "ceramic" is used herein to designate metallic or other inorganic oxides which are generally classed as glass-forming oxides. See "Introduction to Ceramics" by W. D. Kingery, John Wiley & Sons, Inc., New York, 1960. For the purposes of the present invention, the structure may comprise a single metallic or inorganic oxide, such as boron oxide, silicon dioxide, aluminum oxide, zirconium oxide and the like or mixtures of the oxides or the composition may include various materials terms "intermediates" and "modifiers" in the ceramic art. The actual melting or softening point and the resistance to high temperatures of the ceramic structure will be dependent upon the specific composition and may be varied by incorporating the various modifiers or intermediates in the structure during the process of manufacture.

Conventional glass fibers, glass wool, mineral wool, etc., for example, used for filtration purposes, heat- and sound-insulation purposes and the like are generally formed from relatively inexpensive raw materials. These inorganic or mineral fibers are produced economically by extrusion and stretching methods, by a centrifugal disc method wherein a molten glass is extruded by centrifugal force through fine orifices in the edge of the disc or, in the case of mineral wool, a molten slag or glass flows through an aperture by gravity and a blast of steam is directed at right angles against the molten stream to disrupt the stream or atomize it and hurl the minute particles through the atmosphere where they become attenuated to form fibers. Fused quartz filaments, on the other hand, are relatively costly because of the high melting temperature of quartz and the relatively narrow plastic range of the molten quartz which requires special manipulation and handling to form fine filaments or fibers. As is apparent, all of these filaments or fibers are formed by chilling shaped molten masses and, hence, the resulting filaments or fibers are solid. Films or plates may be formed by an extrusion process and other structures are formed by casting techniques.

The so-called "glass or mineral fibers" and "filaments" are utilized in the form of non-woven batts or pads and in forming woven fabrics. Because of the brittleness of the filaments and fibers and the high abrasion between the fibers in a yarn, it is necessary to provide special yarn finishes to reduce abrasion and special equipment is necessary in spinning and weaving operations.

In the copending application of Irvin Wizon, Ser. No. 332,301, filed Dec. 20, 1963, which is commonly assigned and now abandoned, there is disclosed a method of forming high temperature-resistant bodies from an intimatae mixture of a cellulosic material and a glass-forming oxide. In this method, the ceramic constituents or substances which will be transformed into or converted to ceramic constituents are incorporated into a cellulosic solution such as, for example, a viscose solution. The solution is then shaped into a desired structural form, such as filaments, plates and the like, by conventional procedures. For example, in the case of viscose, the solution containing cellulose xanthate and the ceramic constituent is extruded through suitable orifices into a conventional acid spinning bath. The spun product is then subjected to usual after treatments and finally dried. The recovered product will consist essentially of the cellulosic material such as regenerated cellulose and the ceramic constituent each being uniformly distributed throughout the body and in intimate contact with the other.

This body may be used as an ablative material and when subjected to elevated temperatures will pass through several states or phases while retaining its physical form. The cellulosic constituent will first be decomposed and transformed into carbon. Under sufficiently high temperatures and in the presence of oxygen, the carbon becomes oxidized or burned off leaving the ceramic material in about the same form as the original body. Additional energy may be utilized in sintering the ceramic constituent. When oxygen is absent, the cellulosic constituent will be decomposed and transformed into carbon and when the temperature is sufficiently high, a carbide is formed of the metal or metalloid present.

One of the purposes of the present invention is to provide a method of making carbon-ceramic structures of increased strength.

One of the specific purposes of the invention is to provide an improved method for forming silicon carbide structures.

Other objects and advantages of the invention will become apparent from the following description and claims.

The present invention contemplates the heat-treatment of cellulosic-ceramic bodies in controlled atmospheres and under controlled temperature conditions so as to decompose the cellulosic material and form ceramic-carbon structures and also deposit carbon on such structures. Further, the invention contemplates additional heat-treatment of the ceramic-carbon structures so as to transform the same into corresponding carbide bodies or structures.

In order to simplify the description and discussion, the invention will be illustrated by reference to the heat-treatment of filaments consisting essentially of a cellulosic material and a glass-forming inorganic oxide or a compound which during the filament processing stage will be transformed into or converted to a glass-forming inorganic oxide. For example, the filaments may be formed from a mixture of viscose and sodium silicate. As is well known, viscose is a caustic soda solution of cellulose xanthate in which sodium silicate is soluble. An alkali solution of a cellulose ether, such as hydroxyethyl cellulose, is equally satisfactory as the cellulosic material and other glass-forming inorganic oxide compounds, such as aluminates or borates, may be substituted for the sodium silicate or used in combination with the silicate. Advantageously, the ceramic constituent is added to the spinning solution in the form of a soluble compound which precipitates, polymerizes and forms its network under the conditions required to coagulate and/or regenerate the cellulosic constituent. Under these conditions, the cellulosic and the ceramic constituents are intimately mixed with each other, but with each constituent forming its own continuous network which is in intimate contact and intermingled with the network of the other constituent. Each of the networks is of such nature that it will retain the configuration of the body or structure upon removal of the other network.

In accordance with the present invention, the heating of the body is carried out in definite stages. During the first of the heat treating stages, the temperature of the body is raised to from about 200° C. to about 250° C., precautions being taken during this heating stage to avoid steam accumulation within the body itself. During this stage, structurally held water is driven off and the cellulose begins to decompose. Preferably, the body is maintained in a moving stream of an oxygen-containing atmosphere during this heating stage so as to remove the water vapor and any other volatilized substances.

This atmosphere is then replaced with an inert atmosphere, such as oxygen-free nitrogen, argon, etc., and the temperature raised to from about 400° C. to about 450° C. so as to effect pyrolysis of the cellulose and other organic substances that may be present. The rate of heating during this stage should be relatively low in order to avoid distortion of the body and, in the case of filaments, to allow the filaments to retain their individual identities and to avoid a fusion of the same. Slow pyrolysis is also essential so as to achieve a maximum shrinkage of the body. High rates of heating during this stage are accompanied by a distortion of the structure and the production of a liquid phase which becomes fused, and, in the case of filaments, results in bonding of the filaments. The liquid phase may result from the presence of residual moisture and/or other organic materials and a rapid heating appears to form, in addition, a tarry surface coating which ultimately cokes. Hence, the slow rate of heating is also essential so as to prevent the formation of this tar-like coating.

The oxygen-free atmosphere is subsequently replaced by an atmosphere containing a pyrolyzable carbonaceous substance, such as an atmosphere containing a hydrocarbon gas or vapor that decomposes at elevated temperatures, so as to deposit additional carbon in and on the structure. The atmosphere may comprise nitrogen and a hydrocarbon, such as methane, ethane, propane, benzene and the like, or the atmosphere may consist solely of the hydrocarbon. The temperature of the body or structure, while in this oxygen-free atmosphere, is then raised to from about 900° C. to about 1200° C., preferably between about 900° C. and 1100° C. During this heating stage, the last traces of volatilizable substances will be driven off and the carbon resulting from the pyrolysis of the cellulose and of the hydrocarbon forms its network. The period during which the body is maintained at its elevated temperature should be sufficient to effect a weight increase of from about 10% to about 150%. Thus, in the case of filaments, the filaments are maintained in the carbonaceous atmosphere at the elevated temperature for a period sufficient to effect an increase in the filament denier of between about 10% and 150%. Greater deposits of carbon render the filaments stiff and brittle and excessive carbon deposition cements together the filaments.

At temperatures below about 900° C., such as at 800° C., the carbon resulting from pyrolysis of the hydrocarbon forms an undesirable black matte deposit. The carbon formed at temperatures within the stated range appears as a shiny deposit and also appears to be somewhat more dense than deposits formed below about 900° C., Temperatures much in excess of 1200° C., should be avoided because the carbon deposits as a film and tends to cement together the filaments. Also, temperatures in excess of about 1200° C. are also disadvantageous in that the silica component begins to crystallize and renders the product brittle.

The product is then cooled, preferably in an inert atmosphere in order to avoid oxidation of the carbon. During these treating stages, the products are preferably maintained under a slight tension sufficient to prevent curling or warping.

The heating rates and periods will be dependent upon the specific structure being treated and upon the specific method being used, that is, whether a batch method or a continuous method. It is obvious that all portions of the structure must be heated to the required temperatures and, hence, the greater the bulk, the lower the rate of heating and the greater the period. For example, in the heat treatment of a relatively small tow of filaments, the rate of heating may be high and the period may be brief because of the small bulk. On the other hand, when the filaments are woven into a fabric and the fabric has been rolled into a cylindrical form, the rate of heating of the fabric roll must be low and the period must be prolonged. The cellulose-ceramic constituent filaments are poor conductors of heat and, accordingly, a long period is required to bring the innermost portions of the roll of fabric to the required temperatures.

In the initial stages, it is essential to drive off the residual moisture and effect pyrolysis of the cellulose and to remove the volatilized materials. Accordingly, in the treatment of a relatively small tow of filaments, these results are attained rather rapidly. On the other hand, the pyrolysis of the cellulose and the removal of volatilized materials from the inner portions of a fabric roll require a substantially greater treating period. The heating period at the higher temperatures during which carbon is deposited on the filaments will also be dependent upon the concentration of the pyrolyzable hydrocarbon in the atmosphere. Obviously, the higher the proportion of methane, for example, the shorter the period for the deposition of a fixed amount of carbon.

For use in ablative type structures such as rocket nozzles, nose cones, etc., the structure is preferably in the form of a woven fabric tape. Accordingly, the untreated filaments are woven into a desired fabric structure and the fabric structure subjected to the foregoing heat-treating steps. The fabric now consisting essentially of carbon and a glass-forming oxide, such as silica, is impregnated with a high temperature or ablative type resin, such as, for example, a phenolic resin, and the impregnated tape spirally wound into the desired configuration. The structure thus formed is subjected to heat and pressure to cure the resin. In use, when the structure is subjected to elevated temperatures in the absence of oxygen, the carbon-silica filaments absorb appreciable amounts of energy and become transformed or converted into silicon carbide filaments. The silicon carbide filaments are extremely resistant to the erosive action of the high temperature exhaust gases.

The carbon-silica structures, such as filaments or fabrics, as described hereinbefore, may be converted into silicon carbide filaments or fabrics by heating in an inert atmosphere. After the heat-treatment in the presence of a decomposable carbonaceous material, such as an atmosphere containing a hydrocarbon gas, the atmosphere is replaced with an inert atmosphere such as argon, helium, hydrogen, carbon monoxide, nitrogen and the like. The filaments then heated rapidly to 1300° C. to 2000° C. and maintained in this temperature range for at least a few seconds, but the period should not be prolonged to the point at which appreciable crystal growth will be obtained. Prolonged heating of the product in this temperature range renders the product brittle due to crystal growth and destroys the filamentary characteristics. For certain uses, a fabric formed of the silicon carbide filaments may be impregnated with a high temperature or ablative type resin, such as the known phenolic resins, and the body molded to a desired configuration.

Although in this discussion the filaments have been termed "silicon carbide filaments," it is to be understood that the filaments may consist essentially of silicon carbide or silicon carbide and carbon or silica, silicon carbide and carbon depending upon the relative proportions of silica and carbon. The composition will also be dependent upon the period during which the filaments were maintained at the required elevated temperatures. Similiarly, when the other inorganic oxides are present in the carbon-ceramic filaments, the fired product may contain the carbide with or without the oxide and carbon.

In forming the filaments, it is preferred that the glass-forming oxide be introduced into the alkali solution of the cellulose compound as a soluble compound. Thus, the silica, alumina and boron oxide is preferably introduced as an alkali-soluble silicate, aluminate or borate. In the case of zirconium oxide and other insoluble hydroxide forming elements, the hydroxide is preferably formed in the alkali spinning solution by introducing an aqueous solution of a water-soluble zirconium or other salt, such as zirconium sulfate by the well known injection spinning method wherein the salt solution is introduced just prior to the spinneret and introduced with sufficient agitation so that the zirconium or other hydroxide is thoroughly and intimately distributed in the alkaline spinning solution as it reaches the spinneret.

The ratio of the amount of glass-forming inorganic oxide to the amount of cellulose in the structures is from 0.2:1 to about 2:1. Ordinary commercial grades of sodium silicate, sodium aluminate and sodium borate may be used in the alkaline viscose or cellulose ether solution. During the coagulation and/or regeneration of the cellulosic constituent, the soluble silicate, aluminate, borate or other constituent is transformed or converted into the glass-forming oxide in situ in an extremely finely divided state, possibly in a molecularly dispersed state. Similarly, when a soluble zirconium salt is incorporated in the alkaline solution, the zirconium hydroxide is also in an extremely finely divided form. It has been established whether the precipitated silicic acid or corresponding aluminum, boron and zirconium compound is transformed into the oxide, but it is probable that the original precipitated compound is transformed into some form of hydrate during the various processing steps.

Considering a batch method of treating a tow or skein of filaments or a fabric strip consisting essentially of regenerated cellulose and silica (or a silica hydrate), the body is placed in a suitable furnace and the temperature of the body is raised to about 200° C. The rate of heating appears to be immaterial providing precautions are taken to avoid steam pressure bulid up. The temperature is then raised to about 250° C. over a period of about one hour. During these initial heating stages, it is preferable to pass through the furnace an oxygen-containing atmosphere so as to remove the water vapor and any other volatilized material. The atmosphere in the furnace is then replaced with an inert atmosphere such as oxygen-free nitrogen, argon, etc. and the temperature of the body is raised to about 400° C. to 450° C. at a rate of about 35° C. per hour. During this heating stage, the rate of temperature increase is relatively low so as to effect pyrolysis of the cellulose and other organic material which may be present without distorting the body and without effecting fusion. The inert gas is passed over the body continuously so as to remove any volatilized substances. Slow pyrolysis is essential so as to achieve maximum shrinkage of the body or structure and, in the case of a bundle of filaments, to allow the filaments to retain their individual identities. A greater rate of heating during this stage is accompanied by a distortion of the structure and appears to produce a liquid phase which causes a fusion and bonding together of the filaments, as described hereinbefore.

The atmosphere is then replaced with an atmosphere containing a pyrolyzable hydrocarbon, such as a mixture containing 5% methane and the balance nitrogen. The temperature of the body is raised to a temperature within the range of from about 900° C. to about 1200° C. at a rate of about 65° C. per hour. During this heating stage, the last traces of volatilizable materials will be driven off, carbon is deposited and the carbon forms its network. Preferably, the body is held at a temperature of between about 900° C. and about 100° C. for from two to three hours to deposit the desired amount of carbon. Temperatures much in excess of 1200° C. should be avoided during this heating stage because the carbon deposits as a film and will tend to cement together the filaments. Also, temperatures in excess of about 1200° C. are also disadvantageous in that the silica component begins to crystallize and thus renders the product brittle. Although it is stated that the atmosphere during this stage contains 5% of the hydrocarbon, the atmosphere may contain any desired proportion of the hydrocarbon and the period adjusted accordingly.

The filaments, fabric or other structure now consisting essentially of the inorganic oxide and carbon may be cooled in an inert atmosphere and utilized for an intended purpose, or the structure may be converted into a corresponding carbide. In the later instance, the hydrocarbon atmosphere in the furnace is replaced with an inert atmosphere. The structure is then heated rapidly in the inert atmosphere to a temperature of from about 1300° C. to about 2000° C. and maintained at the elevated temperature for several minutes. The structure is then cooled.

The invention may be illustrated specifically by a batch method of treating regenerated cellulose-silicic acid or silica hydrate filaments having a ratio of silica to cellulose of approximately 0.82:1.

A series of tows of the filaments having a total denier of approximately 2500 and consisting of 1500 filaments were individually suspended in a vertical, electrically heated tube furnace. A 4.7 gram weight was secured to the lower end of the tow in order to maintain the filaments under a slight tension. During the several heating stages, the appropriate atmosphere was introduced at the lower end of the tube and passed upwardly.

After suspending the tow in the furnace, air was passed through the furnace and the temperature of the tow was raised to 200° C. While continuing the air flow, the temperature of the tow was gradually raised to about 250° C. over a one hour period. The furnace atmosphere was then replaced by flushing with nitrogen and the temperature of the filaments then raised to a temperature of about 450° C. at a rate of 35° C. per hour.

The temperature of the filaments was then increased to 1000° C. at a rate of 65° C. per hour and methane added to the nitrogen atmosphere. The filaments were maintained at this temperature for 3 hours and the filaments were then cooled to room temperature.

In the case of the first tow, Sample A, the amount of methane in the nitrogen atmosphere was about 0.8% and the filaments were cooled slowly in the nitrogen atmosphere.

In the case of the second tow, Sample B, the amount of methane in the nitrogen atmosphere was 5% and the filaments were cooled slowly in the nitrogen atmosphere.

In the case of the third and fourth tows, Samples C and D, the nitrogen atmosphere contained 5% methane and the filaments were shock cooled by withdrawing the tows at the completion of the heating and suspending them in the air.

As a control, one tow, Sample I, was heated in carbon monoxide and cooled slowly in carbon monoxide. Carbon monoxide was used as the inert atmosphere because it was known that the available nitrogen contained traces of oxygen. In the firing of the other samples, methane was added to the nitrogen and at the temperatures involved a minute proportion of the methane removed the oxygen.

The sizes and tensile strengths of the treated samples were as follows:

| Sample | Denier/Filament | Grams/Denier |
|---|---|---|
| I | 1.0 | 1.7 |
| A | 1.4 | 1.7 |
| B | 1.6 | 4.3 |
| C | 1.65 | 4.8 |
| D | 1.56 | 3.2 |

The data illustrate that with an increase in the carbon deposition, the tenacity or tensile strength of the fired filaments increases. The strength characteristics also vary with changes in the relaitve proportions of the inorganic oxide and cellulose in the unfired structures. For example, a tow of filaments consisting essentially of regenerated cellulose and silica (or silica hydrate) having a ratio of silica to cellulose of 1:1 when subjected to the same heat-treating stages as Sample C exhibited a tenacity of 6 grams per denier.

A 1650/980 filament yarn was woven into a plain weave fabric of 22 x 26 construction. The filaments consisted essentially of silica (or a siilca hydrate) and regenerated cellulose and contained 0.82 part of silica to 1 part of cellulose. A strip of the woven fabric was placed in a furnace and subjected to the heating stages as described in the foregoing examples. During the heat treatment at 1000° C., the nitrogen atmosphere contained 30% methane. Following this heating stage, the atmosphere was replaced with an atmosphere of nitrogen containing 1% methane. The temperature was then raised rapidly to about 2000° C. and maintained at that temperature for about 30 seconds followed by slowly cooling the fabric in the nitrogen atmosphere containing 1% methane.

The resulting fabric was dark gray in color and had a specular appearance in contrast to the jet black color of a fabric not subjected to the final heating stage. The filaments retained their individual identities and exhibited an X-ray diffraction pattern of B-silicon carbide.

Although the foregoing examples illustrate a batch method of heat-treating the structures, a continuous method is equally satisfactory. In a continuous method, the tow of filaments or a fabric is passed through an elongated furnace partitioned into sections wherein the required atmospheres and temperatures are regulated to provide the necessary heat-treating stages. The heating rates are substantially increased and the periods during which the products are maintained at required temperatures may be substantially decreased.

The table which follows illustrates the substantial differences in the time periods when utilizing a continuous method as compared to the batch method as specifically illustrated hereinbefore. In this instance, a 1650/1500 tow of filament (1.1 denier/filament) consisting essentially of regenerated cellulose and silica (or a silica hydrate), the ratio of silica to cellulose being 0.82:1, was passed through a tube furnace. The central portion of the furnace was heated to provide the indicated temperatures and the entire atmosphere in the furnace was as set forth in the table. The rate of travel of the tow through the furnace was such that the time of heating of the tow to the indicated temperature and the time for the tow to emerge from the furnace after leaving the hot zone were equal to the time the tow was at the stated temperature.

| Sample No. | Percent $CH_4$[1] | Max. Temp. (° C.) | Time in Hot Zone (min.) | Denier/ filament | Denier increase, percent | Strength, Grams/ denier |
|---|---|---|---|---|---|---|
| 1 Control | 25 | 1,000 | 0.6 | 0.5 | | 0.7 |
| 2 | 25 | 1,000 | 8 | 0.9 | 80 | 2.5 |
| 3 | 100 | 1,000 | 2 | 0.9 | 80 | 2.6 |
| 4 | 5 | 1,100 | 4 | 0.6 | 20 | 2.4 |
| 5 | 25 | 1,100 | 2 | 0.8 | 60 | 3.5 |
| 6 | 100 | 1,100 | 1 | 0.8 | 60 | 2.0 |
| 7 | 5 | 1,200 | 2 | 0.7 | 40 | 2.7 |
| 8 | 25 | 1,200 | 1 | 0.8 | 60 | 2.9 |
| 9 | 100 | 1,200 | 0.6 | 0.8 | 60 | 3.1 |

[1] Balance of atmosphere, Nitrogen.

It will be noted the Sample No. 1 designated as a control sample was heated at 1000° C. for 0.6 minute in an atmosphere of 25% methane and 75% nitrogen. Previous experimental work had shown that at 100° C. for this time in this atmosphere effected no deposition of carbon and that the carbon contained in the treated structure resulted solely from the decomposition of the cellulose.

The table illustrates that about the same increase in strength characteristics may be obtained in shorter time periods by increasing the methane content of the atmosphere. Also, for a given atmosphere, an increase in the strength characteristics may be obtained by increasing the maximum temperature.

The carbon in the carbon-inorganic oxide structures is in an amorphous form and can be termed an amorphous pyrolytic carbon because the temperatures employed during the heat-treating stages are not sufficiently elevated to convert the carbon into a graphite form. One of the most unique characteristics of the carbon-in-organic oxide structures produced in accordance with this invention is the high modulus. It is known that the modulus of amorphous forms of carbon is relatively low as compared to the modulus of silica. Nevertheless, the modulus of the carbon-inorganic oxide structures is approximately equivalent to that of silica. For example, filaments as described in the foregoing specific examples containing about 40% carbon and 60% silica have approximately the same modulus as silica.

It is not known with certainty in which precise form or combination the glass-forming oxides exist in the dried and heat-treated products. It would appear that in the manufacture of the products, the glass-forming oxides are first present in the coagulated and/or regenerated products as acids. For example, in the case of an alkali silicate in the spinning solution, silicic acid is formed in the acid bath which gels due to polymerization. Water is removed during the drying and heat-treating stages, but it is believed that the temperatures involved are not sufficiently high to remove all water. Hence, the oxide, such as silica, is present probably in the form of a hydrate of the oxide. Accordingly, in the description and claims, reference to the relative proportions or ratios between the oxides and cellulose or oxides and carbon, such as silica and cellulose or silica and carbon, is to be understood to relate to the proportions or ratios of the oxide per se and dry cellulose or carbon.

I claim:
1. The method of forming a high temperature-resistant and erosion-resistant shaped structure which includes the steps of heating a shaped structure comprising a cellulosic material and at least one polymerized glass-forming inorganic oxide each present in its own continuous network in intimate contact with and intermingled with the network of the other, the ratio of the oxide to cellulosic material being from 0.2:1 to 2:1, to a temperature of from about 200° C. to about 250° C. until structurally held water is released, thereafter heating the structure in an inert atmosphere to a temperature of from 400° C. to 450° C. until the cellulosic material is decomposed, thereafter adding carbon to the structure by heating the same to a temperature of from 900° C. to 1200° C. in the presence of a pyrolyzable carbonaceous substance and thereafter cooling the structure.

2. The method as defined in claim 1 wherein the structure is maintained in an oxygen-containing atmosphere while being heated to a temperature of from about 200° C. to about 250° C.

3. The method as defined in claim 1 wherein the structure is maintained in an inert atmosphere containing a pyrolyzable hydrocarbon while being heated to a temperature of from 900° C. to 1200° C.

4. The method as defined in claim 3 wherein the hydrocarbon is methane.

5. The method as defined in claim 1 wherein the glass-forming inorganic oxide is silica.

6. The method as defined in claim 1 including a step of converting at least a portion of the glass-forming inorganic oxide to a corresponding carbide by heating the structure, prior to cooling, to a temperature of from 1300° C. to 2000° C. while maintaining the structure in an inert atmosphere.

7. The method as defined in claim 6 wherein the glass-forming inorganic oxide is silica.

8. The method of forming a high temperature-resistant and erosion-resistant shaped structure which includes the steps of heating a structure comprising a cellulosic material and at least one polymerized glass-forming inorganic oxide each present in its own continuous network in intimate contact with and intermingled with the network of the other, the ratio of the oxide to cellulosic material being between 0.2:1 and 2:1, to a temperature of from about 200° C. to about 250° C. until structurally held water is released, thereafter heating the structure in an inert atmosphere to a temperature of from 400° C. to 450° C. at a rate of about 35 centigrade degrees per hour until the cellulosic material is decomposed, thereafter adding carbon to the structure by heating the structure to a temperature of from 900° C. to 1200° C. at a rate of about 65 centigrade degrees per hour in the presence of a pyrolyzable carbonaceous substance, maintaining the structure at such temperature and in said atmosphere for a period of from 2 to 3 hours and thereafter cooling the structure.

9. The method as defined in claim 8 wherein the structure is maintained in an oxygen-containing atmosphere while being heated to a temperature of from about 200° C. to about 250° C.

10. The method as defined in claim 8 wherein the structure is maintained in an inert atmosphere containing a pyrolyzable hydrocarbon while being heated to a temperature of from 900° C. to 1200° C.

11. The method as defined in claim 10 wherein the hydrocarbon is methane.

12. The method as defined in claim 8 wherein the glass-forming inorganic oxide is silica.

13. The method as defined in claim 8 including a step of converting at least a portion of the glass-forming inorganic oxide to a corresponding carbide by heating the structure, prior to cooling, to a temperature of from 1300° C. to 2000° C. while maintaining the structure in an inert atmosphere.

14. The method as defined in claim 13 wherein the glass-forming inorganic oxide is silica.

References Cited

UNITED STATES PATENTS

| | | | |
|---|---|---|---|
| 1,058,800 | 4/1913 | Smith et al. | 264—29 X |
| 3,281,261 | 10/1966 | Lynch | 264—29 X |
| 3,325,570 | 6/1967 | Blum et al. | 264—29 X |

ROBERT F. WHITE, *Primary Examiner.*

J. H. SILBAUGH, *Assistant Examiner.*

U.S. Cl. X.R.

23—209.1; 264—83, 85